Sept. 4, 1962  E. H. ANDERSON  3,052,018
ASSEMBLY APPARATUS

Filed Oct. 2, 1957  3 Sheets-Sheet 1

INVENTOR.
EDWIN HENRY ANDERSON
BY
ATTY.

Sept. 4, 1962  E. H. ANDERSON  3,052,018
ASSEMBLY APPARATUS
Filed Oct. 2, 1957  3 Sheets-Sheet 2
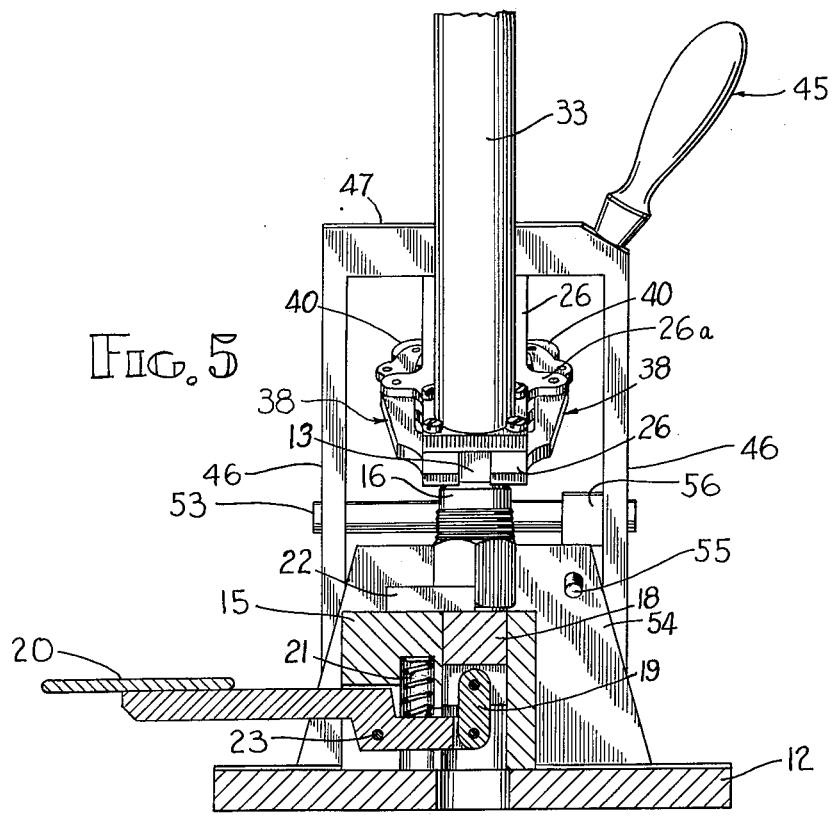
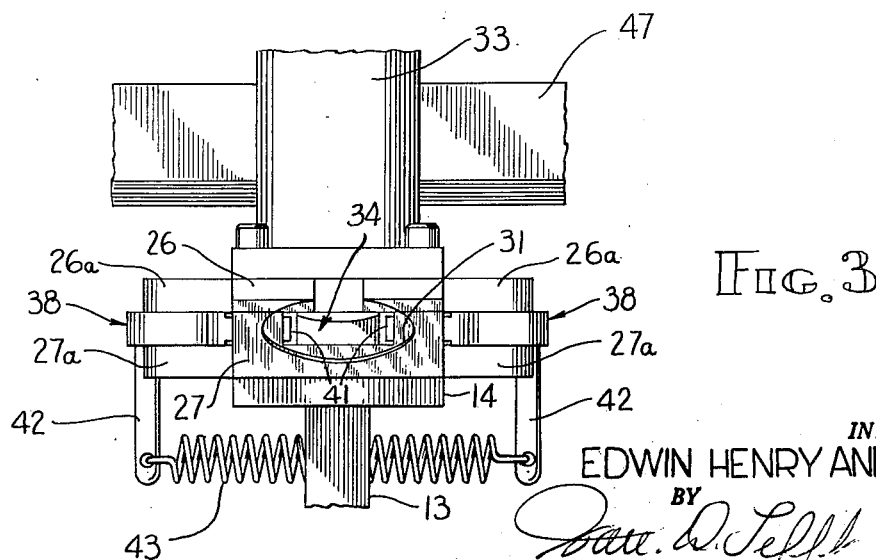
INVENTOR.
EDWIN HENRY ANDERSON
BY
ATTY.

Sept. 4, 1962  E. H. ANDERSON  3,052,018
ASSEMBLY APPARATUS
Filed Oct. 2, 1957  3 Sheets-Sheet 3
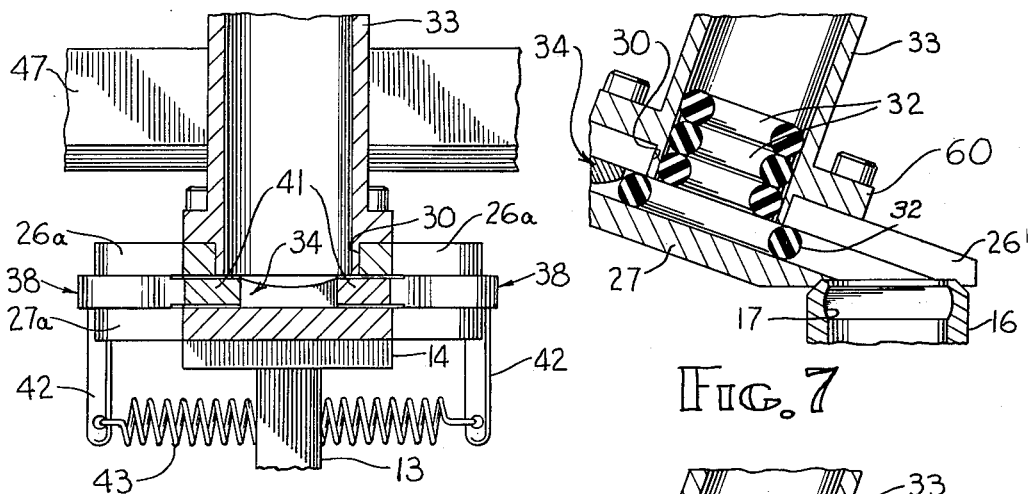
Fig. 4
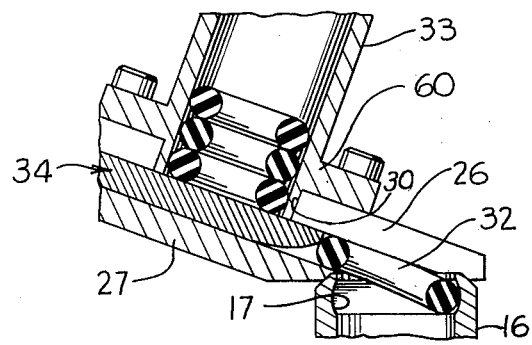
Fig. 7
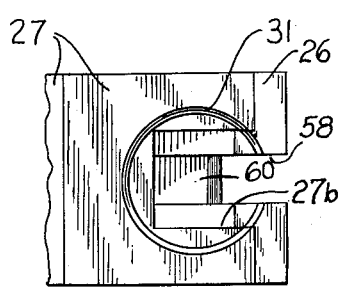
Fig. 6
Fig. 10
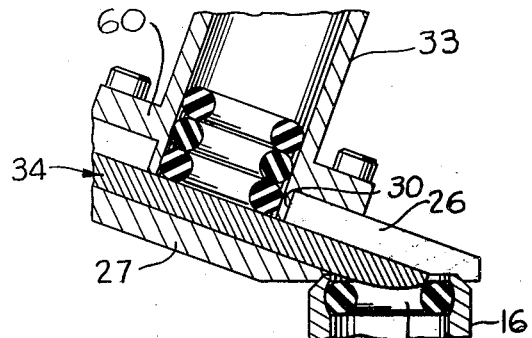
Fig. 8
Fig. 9
INVENTOR.
EDWIN HENRY ANDERSON
BY
ATTY.

3,052,018
ASSEMBLY APPARATUS
Edwin Henry Anderson, Janesville, Wis., assignor, by mesne assignments, to The Parker Pen Company, Janesville, Wis., a corporation of Wisconsin
Filed Oct. 2, 1957, Ser. No. 687,685
5 Claims. (Cl. 29—235)

This invention relates to an assembling apparatus and more particularly to an assembling apparatus for assembling a body and a resilient ring by placing the resilient ring into an annular groove interiorly of the body.

In accordance with the invention, an apparatus is provided wherein a circular O-ring of resilient material is inserted into an annular groove in the interior of a tubular member such as a bushing or nut. The apparatus places the O-ring in a guide and deforms the O-ring into an elongate form, and then in one continuous smooth movement directs the O-ring along the guide and fully home into the groove.

It is therefore an object of this invention to provide means for quickly and conveniently assembling a resilient ring into a groove interiorly of a body.

Another object is to provide such means comprising a minimum of apparatus.

It is a further object to provide such means which are simple, reliable and not likely to get out of adjustment or need frequent repair.

Another object is to move the ring into the groove in one smooth continuous motion.

Other objects and advantages will appear from the following detailed description when considered in conjunction with the accompanying drawings, wherein:

FIG. 3 is a view taken on line 3—3 of FIG. 1, a portion of the device being removed;

FIG. 4 is a view taken on line 4—4 of FIG. 1, a portion of the device being removed;

FIG. 5 is a view taken on line 5—5 of FIG. 1;

FIG. 6 is a view taken on line 6—6 of FIG. 1, the bushing or nut being removed;

FIGS. 7, 8 and 9 are sectional views through a portion of the device, along the vertical center line of FIG. 5, illustrating the operation of the device as the O-ring is moved into the groove for receiving it; and FIG. 10 is a side elevational view of the shuttle or sliding member of the device.

Figure 1:
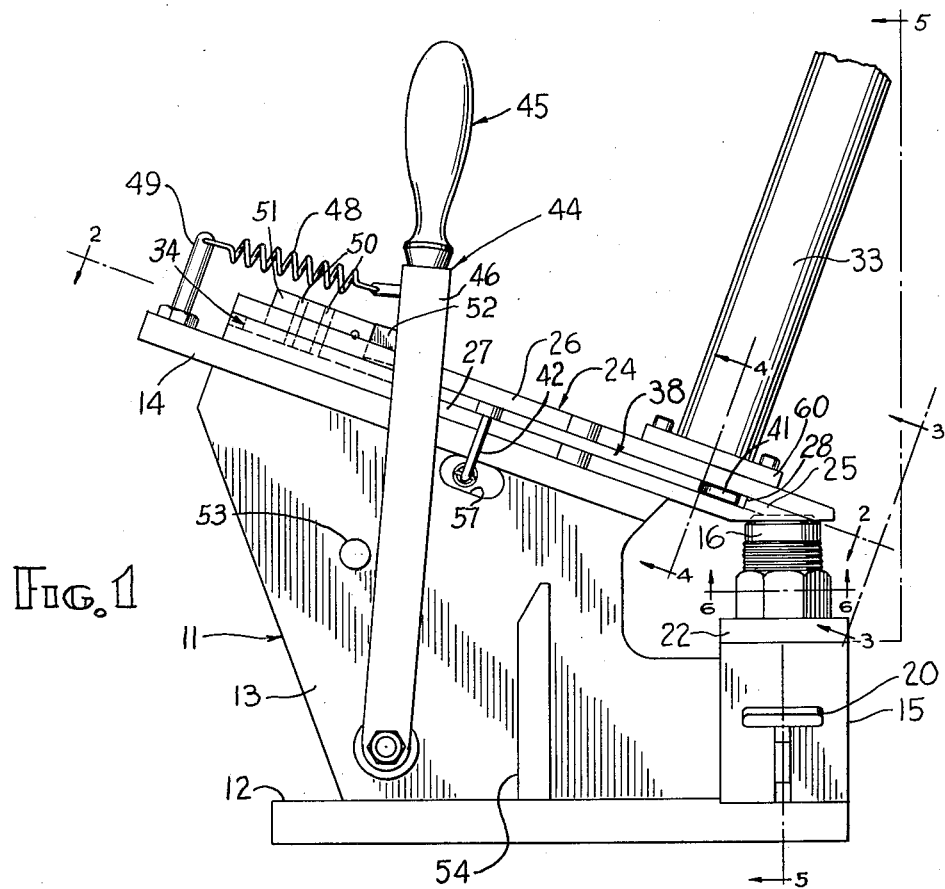
FIG. 1 is a side elevational view of a device embodying the invention.

Referring to the drawings, wherein like reference characters designate the same parts throughout the several views, the device includes in general a support 11 having a shuttle housing or guideway 24 mounted thereon, a shuttle or slide 34 slidably mounted in said guideway, and means for introducing an O-ring 32 into the guideway to be compressed by a pair of rocker arms 38 and moved through the guideway and inserted into a groove 17 in a bushing 16 by the slide 34.

The nut or bushing 16 and the O-ring 32 are assembled by the device. The bushing 16 has an annular groove 17 interiorly thereof near the top end thereof. The O-ring must be placed into this groove 17 and this is no easy task. Manual attempts to do so are unsatisfactory, requiring difficult manipulation and a great deal of time. The O-ring must be deformed in order to enter the bushing; it must then be placed into a portion of the groove; and it must then be manipulated around to be placed fully home in the groove. The device of this invention, however, performs this operation quickly, smoothly, simply, and reliably. The device is described in detail hereinbelow.

The support 11 includes a base 12 having an upright wall 13 extending therefrom and supporting a table top 14. The table top 14 is inclined from the horizontal for reasons hereinafter explained. A bushing support 15 also extends from said support 11 for holding in position the nut or bushing 16 so that the groove 17, interiorly of the bushing, is in position for receiving an O-ring from the guideway 24. A bushing support piston 18 holds the bushing in position. (See FIG. 5.) The piston 18 is connected by a link 19 to a lever 20 which may be operated about a pivot 23 and against the force of a spring 21 to place the bushing in position for receiving an O-ring. A bushing guide 22 overlies a portion of the top of support 15 and may be shaped to match the bushing to facilitate placement of the bushing on the bushing support. Suitable results are obtained by forming the guide 22 into a semi-circular or C-shape, opening to the right as seen in FIG. 5. Such a shape permits the bushing 16 to be easily placed from the right and properly located under the guideway 24.

Figure 2:
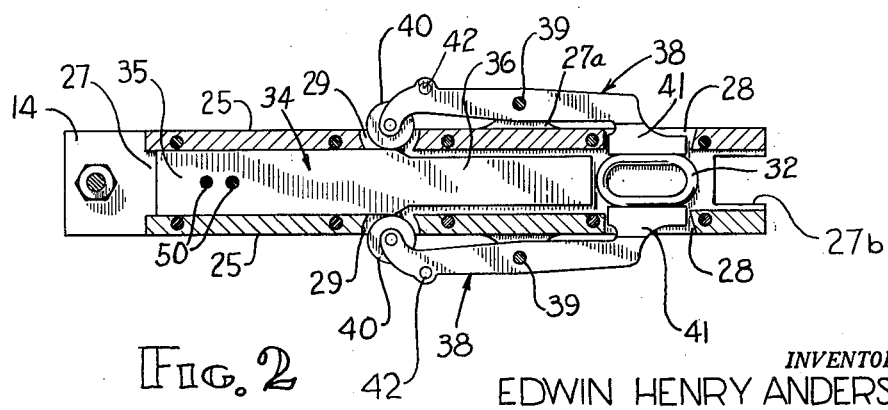
FIG. 2 is a view taken on line 2—2 of FIG. 1, a portion of the device being removed, and also showing an O-ring placed therein and compressed from its normal circular form into an elongate form.

The slide housing or guideway 24 includes a pair of side walls 25, a pair of top pieces 26 forming a cover therefor, and a bottom wall or floor 27. The top pieces 26 have ears 26a extending therefrom and the floor 27 has ears 27a extending therefrom, for pivotably mounting between said ears the rocker arms 38. (See FIGS. 3, 4 and 5.) The floor of the housing 24 is cut away at the forward end thereof to form an opening 27b through which the O-ring is fed into the bushing. The side walls 25 have openings 28 therethrough for permitting the forward ends of rocker arms 38 to pass therethrough, and have openings 29 therethrough for permitting the rearward ends of rocker arms 38 to pass therethrough. (See FIG. 2.) The top pieces 26 have an opening 30 therethrough permitting the O-rings to enter the housing. A tapered blind bore 31 is provided, in the underside portions of the front ends of floor 27 and cover pieces 26, for receiving therein the top of the bushing to thereby position the bushing for receiving an O-ring. The top pieces 26 do not come together at the center thereby providing an opening 58 over the length of the housing facilitating oiling of the guideway and slide. The bushing 16 is positioned so that groove 17 is disposed in a plane and is shown disposed horizontally or in the horizontal plane. The table top 14 and the guideway 24 are disposed at an angle with the horizontal, being inclined therefrom to align one side of the groove 17 in the bushing 16 with the guideway 24 and slide 34. The guideway is thus inclined from the horizontal plane of groove 17, and is thus referred to herein as being at an angle to the plane of the groove; this angle being from about 18 to 20 degrees.

The O-rings 32 are stored in a feed-hopper tube 33 which is mounted on cover 26 in opening 30 to feed, by gravity, an O-ring into the slide housing each time the slide moves rearwardly of the opening 30. The tube 33 has a base plate or flange 60 for conveniently mounting the tube on the housing in any convenient manner, such as by screws, as is shown.

The shuttle or slide 34 has a wide rear portion 35 and a narrow front portion 36, the edges of which form a surface for the rocker arms 38 to ride upon. The forward end of the slide terminates in a camming face 37.

The rocker arms 38 are pivotably mounted on ears 26a, 27a by pivot pin 39. The rocker arms include, at their rearward ends, cam wheels 40 which extend through openings 29 and ride on the slide 34. The rocker arms also include, at their front ends, grippers 41 which may extend through openings 28 and grip and compress an O-ring.

The rocker arms are resiliently connected to each other through spring pins 42 and spring 43. The spring 43 passes through an opening 57 in the upright wall 13 and urges the rearward ends of the rocker arms toward each other.

A drive lever 44 having a handle 45, a pair of upright arms 46 and a top yoke arm 47 is provided for conveniently moving the slide or shuttle 34. A spring 48, connected to the lever 44 and to a pin 49 on the support 11, biases the lever rearwardly. The lever is connected to the slide or shuttle 34 through a link 52, a block 51 and pins 50. A stop rod 53 is disposed for limiting the rearward movement of the lever. For limiting the forward movement thereof, a stop wall 54 has mounted therein a stop screw 55 which is disposed for engagement with a stop bumper 56 on the lever.

The operation of the device is as follows:

The feed-hopper tube 33 is supplied with a stack of O-rings. The lever 44 is released and thus is biased by spring 48 to its rearwardmost position resting against stop rod 53. The slide 34 is then at its rearwardmost position so that the cam wheels 40 of the rocker arms 38 move inwardly to ride on the narrow forward portion 36 of slide 34. Because of the pivoted mounting of the rocker arms 34, this causes the grippers 41 thereof to move outwardly through openings 28 leaving ample space in the housing 34 for an O-ring to drop thereinto from tube 33 and to lie on the floor 27 of the housing in the undeformed or normal circular form.

A nut or bushing 16 is placed on the bushing support 15 directly over piston 18. Lever 20 is then depressed, and as it pivots about pivot pin 23, the piston 18 is raised and pushes the bushing upwardly into the blind bore 31. The bushing 16 is now in the proper position for receiving an O-ring into its groove 17. A portion of groove 17 (the right hand side in FIGS. 7, 8 and 9) is in line with the guideway 24 and with the direction of movement of the slide or shuttle 34, i.e. the guideway terminates in said right hand side of the groove. The guideway and shuttle are at an angle to the horizontal plane of groove 17 as hereinabove explained.

With the bushing lever 20 depressed to hold the bushing in place, the drive lever 44 is moved forwardly to move the slide 34 forwardly in guideway 24 toward the O-ring and the bushing. As the slide or shuttle 34 moves forwardly, the cam wheels 40 move outwardly engaging the wide rear portion 35 of shuttle 34 thereby causing the rocker arms 38 to pivot. This occurs just prior to the shuttle engaging the O-ring. The grippers 41 move inwardly, as rocker arms 38 pivot, and grip the O-ring, deforming it from its normal circular form into an elongated form, such as for example an elliptical form. Further forward movement of the lever 44 causes the shuttle or slide to move the O-ring forwardly along guideway 24, the O-ring being maintained deformed between the grippers 41 while engaged thereby, and between the side walls 25 of guideway 24 after moving forwardly of the grippers.

FIGS. 7, 8 and 9 illustrate the operation of inserting the O-ring into the groove 17 in the bushing, showing the progression of the O-ring in the guideway and into the groove, from the time the shuttle first engages the O-ring until the shuttle cammingly pushes the O-ring fully home into the groove in the bushing. In FIG. 7, the lowermost O-ring, lying on floor 27 of the guideway, has been compressed to elongated form by the grippers 41, and the shuttle 34 is just engaging the rearward end of this O-ring. In FIG. 8, the shuttle has moved forwardly and has moved the O-ring so that the forward end of the O-ring has passed through opening 27b and has entered the right-hand side of groove 17. The rearward end of the O-ring is still compressed between side walls 25 of guideway 24. The forward end of the O-ring is free of the guideway and is in the groove 17; the O-ring is not as elongated as it was in the position show in FIG. 7. The O-ring then is "pear-shaped," the rearward end being compressed and the forward end conforming to the semi-circular shape of the portion of the groove that contains it. In FIG. 9, the O-ring has been cammingly pushed completely home in groove 17 and is no longer elongated or deformed but is restored to its normal circular form lying in the circular groove 17. The cam shaped nose 37 of the shuttle 34 has cammed the rearward end of the O-ring down into the left-hand side of groove 17, doing this gradually and progressively as more and more of the O-ring is free of the guideway and less and less of the O-ring remains compressed or deformed therein.

When the O-ring is fully home in the groove in the bushing, the drive lever 44 is released and the bushing lever 20 is released. The slide or shuttle thus returns to its rearwardmost position, and the spring 43 forces the camming of the cam wheels 40 inwardly and the grippers 41 outwardly and another O-ring drops from tube 33 onto the floor of the guideway. The bushing is removed from the bushing support and the device is now ready for receiving another bushing, whereupon the above described operation may be repeated to insert the next O-ring into the groove in the next bushing.

The term "ring" as used herein includes shapes other than circular, as well as circular, such as, for example, elliptical, polygonal or other closed loop shapes, or even unclosed shapes such as C-shapes, U-shapes, etc.

I claim:

1. A device for inserting a resilient ring into an angular groove interiorly of a body, said device comprising: a guideway having a top, a bottom, and a pair of sides, said sides being spaced apart a distance less than the diameter of said ring in its normal form; means for positioning said body to dispose the plane of said groove at an acute angle to the direction of said guideway, and to dispose one side of said groove in line with and at one end of said guideway; ring-inserting means consisting solely of a shuttle slidable in said guideway; means placing said rings one-by-one between the end of said guideway and said shuttle; and gripping means responsive to movement of said shutle toward said other end for deforming said ring into an elongate form having a minor axial dimension approximately the distance between the sides of said guideway to permit said shuttle to push said ring into said guideway, said shuttle having a cam-shaped end engaging said ring whereby upon sliding movement in said guideway said shuttle moves said ring through said guideway into said side of the groove and thereafter cams said ring completely home in said groove in one smooth continuous motion.

2. A device for inserting a resilient ring into an annular groove disposed interiorly of a body and surrounding a hole therein, comprising: an elongate substantially enclosed guideway having a rectangular cross section of transverse dimension less than the normal outer diameter of the ring; a means positioning said guideway at an acute angle relative to the plane of the annular groove and in substantial longitudinal alignment with one portion of the groove and with the forward end of the guideway adjacent the hole of the body; and a shuttle that terminates at its forward end in an inclined surface on its under side, said shuttle being reciprocable longitudinally along said guideway to push a ring disposed in said guideway to move a first side of said ring longitudinally of said guideway into said one portion of the annular groove and to push a second side of the ring along the inclined surface of the shuttle to move said second side of said ring transversely of the guideway into the annular groove.

3. A device for inserting a resilient ring into an annular groove disposed interiorly of a body and surrounding a hole therein, comprising: an elongate substantially enclosed guideway having a rectangular cross section of transverse dimension less than the normal outer diameter of said ring and terminating at its forward end in a plane at an acute angle relative to the longitudinal axis of the guideway; a means positioning said guideway in substantial longitudinal alignment with one portion of the groove and with the plane of the forward end of the guideway substantially parallel to the plane of the annular groove; and a shuttle that terminates at its forward end in an inclined cam surface on its under side and that is reciprocable longitudinally within the guideway to push a ring disposed in said guideway to move a first side of said ring longitudinally of the guideway into said one portion of the annular groove and to push a second side of the ring along the inclined cam surface of the shuttle to cam said second side of said ring transversely of the guideway into the annular groove.

4. A device for inserting a resilient circular ring into a circular groove interiorly of a tubular body, said device comprising: a housing having a guideway therein, said guideway having a top, a bottom and a pair of sides, said sides being spaced apart a distance less than the diameter of said ring in its normal circular form; means for positioning said body to dispose the plane of said groove at an acute angle to the direction of said guideway and to dispose one side of said groove in line with and at the end of said guideway; said top having an opening therethrough; means for guiding said ring through said opening into said guideway; ring-inserting means consisting solely of a shuttle slidably mounted in said guideway, said shuttle having a rearward portion and a forward portion of lesser width than said rearward portion; one of the sides of said guideway having first and second apertures therethrough; a rocker arm pivotably mounted on said housing, the first end of said rocker arm extending through said first aperture and riding on said shuttle, the second end of said rocker arm extending through said second aperture to engage said ring for deforming same, whereby in response to movement of said shuttle said first end of said arm rides on said shuttle from said forward portion to said rearward portion thereby rocking said rocker arm to cause said second end of said arm to deform said ring into an elongate form, said shuttle pushing said ring along side guideway and into said groove, said shuttle having its ring-engaging end cam-shaped to thereby move said ring completely home into said groove in one smooth continuous motion.

5. A device for inserting a resilient ring into a groove interiorly of a tubular body, said device comprising a housing having a guideway therein, said guideway including a top, a bottom and a pair of sides, said top of said guideway having an entrance opening therein permitting said ring to enter guideway, said bottom of said guideway at the forward end thereof being cut away to form an exit opening through which the ring may be fed from said guideway into said groove, said bottom at said forward end also having a blind bore therein for positioning said tubular body to dispose the plane of said groove at an acute angle to the direction of said guideway, ring-inserting means consisting solely of a shuttle slidably mounted in said guideway, said shuttle having a rearward portion and a forward portion of lesser width than said rearward portion, one of the sides of said guideway having first and second apertures therethrough, a rocker arm pivotably mounted on said housing, the first end of said rocker arm extending through said first aperture and riding on said shuttle, the second end of said rocker arm extending through said second aperture to engage said ring for deforming same, whereby in response to movement of said shuttle said first end of said arm rides on said shuttle from said forward portion to said rearward portion thereby rocking said arm to cause said second end of said arm to deform said ring into an elongate form, said shuttle pushing said ring along said guideway and out said exit opening and into said groove, said shuttle having its ring-engaging end cam-shaped to thereby move said ring completely home into said groove in one smooth continuous motion.

References Cited in the file of this patent

UNITED STATES PATENTS 2,374,358     Kling et al. _____ Apr. 24, 1945
2,398,659     Mead _____ Apr. 16, 1946

UNITED STATES PATENT OFFICE
CERTIFICATE OF CORRECTION

Patent No. 3,052,018                          September 4, 1962

Edwin Henry Anderson

It is hereby certified that error appears in the above numbered patent requiring correction and that the said Letters Patent should read as corrected below.

Column 3, line 51, for "itno" read -- into --; column 4, lines 30 and 31, for "angular" read -- annular --; line 42, for "shutle" read -- shuttle --.

Signed and sealed this 25th day of December 1962.

(SEAL)
Attest:

ERNEST W. SWIDER
Attesting Officer

DAVID L. LADD
Commissioner of Patents